United States Patent [19]

Voss-Spilker et al.

[11] Patent Number: 4,628,516
[45] Date of Patent: Dec. 9, 1986

[54] ELECTRODE ARRANGEMENT IN HEAT RUN VESSELS

[75] Inventors: Peter Voss-Spilker, Kempen; Wolfgang Reichelt, Moers-Kap.; Achim Kubon, Neuk.-Vluyn; Franz Keutgen, Lissendorf, all of Fed. Rep. of Germany

[73] Assignee: Mannesmann Aktiengesellschaft, Dusseldorf, Fed. Rep. of Germany

[21] Appl. No.: 664,660

[22] Filed: Oct. 25, 1984

[30] Foreign Application Priority Data

Oct. 28, 1983 [DE] Fed. Rep. of Germany ....... 3339514

[51] Int. Cl.⁴ .............................................. H05B 7/02
[52] U.S. Cl. ..................................................... 373/72
[58] Field of Search ..................... 373/71, 72, 108, 45, 373/36, 41, 30

[56] References Cited

U.S. PATENT DOCUMENTS 4,101,725  7/1978  Shelepov et al. ..................... 373/72
4,125,737  11/1978  Andersson ........................... 373/108

Primary Examiner—Roy N. Envall, Jr.
Attorney, Agent, or Firm—Cullen, Sloman, Cantor, Grauer, Scott, & Rutherford

[57] ABSTRACT

An electrode assembly for a furnace having a refractory lining. The electrode assembly has a conductive casing which houses a replacement body. The casing is sheathed by a conical refractory component with the broad end of the component disposed at the exterior of the furnace and the narrow end adjacent the head of the electrode. The replacement body of the electrode has a central bore, a chamber at the head of the electrode, an annular slit defined between the replacement body, and an outlet through which a cooling fluid is circulated by a suction pump connected to the electrode through the outlet. The electrode head is arranged in the refractory lining of the furnace to provide a space for the deposit of solidified molten melt which forms a protective layer over the electrode head.

5 Claims, 2 Drawing Figures

ELECTRODE ARRANGEMENT IN HEAT RUN VESSELS

BACKGROUND OF THE INVENTION

I. Technical Field

The invention relates to a high-power electrode arrangement for furnaces. In particular, the invention relates to furnaces having at least one electrode embedded in the refractory material of the furnace lining.

II. Background Art

An exemplary electrode arrangement for arc or resistance smelting furnaces is disclosed in West German Patent DE-PS No. 31 06 741, wherein a base plate is arranged outside the brick lining of the furnace vessel, to which the necks of at least two rod-shaped, preferably straight electrodes are conductively connected. One end of the electrodes projects through the brick lining of the furnace vessel into contact with the melt contained in the furnace hearth. A cooling gas flow route is formed between the base plate and furnace vessel through which cooling gas is passed, preferably cooling air, to cool the electrode necks disposed on the outer side of the furnace vessel.

According to the arrangement of the electrodes disclosed in the above-identified patent, only the neck of the electrodes and the base regions of the furnaces immediately surrounding the electrodes are cooled. The proposed gaseous cooling medium is insufficient to cool the electrodes. The result is intense heating of the contact electrodes causing rapid degeneration of the electrodes. In use, the electrodes thermally expand because of the electric resistance heating and the heat conducted from the melt. Expansion of the electrodes causes stresses in the fire-proof material surrounding the electrodes which cause tension cracks.

An example of a furnace having water-cooled electrodes is disclosed in West German Patent DE-AS No. 1558 224 which discloses a furnace vessel having an electrode which projects from above the melt down into the melt. A disadvantage of this electrode arrangement is that it extends through the slag layer and is not protected by and embedded in the fire-proof lining, or refractory lining, of the furnace.

The invention is directed to the problem of providing an electrode which avoids the disadvantages noted above and is effectively cooled resulting in low wear and increased durability.

SUMMARY OF THE INVENTION

According to the present invention, an electrode assembly for a melting furnace having a refractory lining defining an inner surface is provided. An electrode has a head and a base portion and includes a casing which houses a replacement body. An annular slit is defined between the annular facing sides of the replacement body and the casing. A chamber is provided at the head between the casing and the replacement body and is in fluid communication with the annular slit. The replacement body has a central bore which is in fluid communication with a cooling medium inlet at th base portion and with the chamber located in the head portion. A collecting ring is provided in the base portion which is in fluid communication with the annular slit and a fluid outlet. Terminals are formed on the base for connecting the electrode to an electrical circuit. The exterior of the casing is sheathed by a conical refractory component which is in turn embedded in the refractory lining of the furnaces. The conical refractory component, or fireproof sheathing, is frusto-conical in shape, havng its broad end disposed at the exterior of the furnace and its narrow end adjacent to the head of the electrode. The head and narrow end define a base of a cavity formed in the refractory lining in which electrically conductive, wear-resistant material of solidified melt collects and forms a protective cap over the head of the electrode.

The fireproof sheathing is constructed for easy maintenance. The conical shape of the sheathing permits easy exchange of the electrode with its sheathing without dismantling the actual furnace body.

According to the invention, the outer body of the electrode consists of material with a high heat conductivity, e.g. copper, and includes interior guide channels for circulating a cooling medium such that the head surface which is under the highest thermal load has the most intensive cooling. The cooled electrode body is located in the fireproof, or refractory, material of the vessel. At the same time, as a result of the intense cooling, the electrode is designed for high specific electric capacity with a small size of structure.

The arrangement of the electrode head in the vicinity of the inner rim of the fireproof lining of the vessel produces a space for a wear protection layer in front of the electrode head. This protective layer consists of electrically conductive materials, in particular graphite, solidified molten metal or the like which protect the electrode.

The invention also relates to the provision of a cooling medium pumping system for circulating a cooling medium through the electrode assembly sequentially through the inlet, central core, chamber, annular slit and the outlet. The preferred cooling medium circulation system includes a suction pump connected to the electrode through the outlet. In the event the electrode is damaged, penetration of the cooling medium is prevented by the suction cooling circuit if a liquid cooling medium is used. A particular disclosed as the cooling medium is water.

BRIEF DESCRIPTION OF THE DRAWINGS

An embodiment of the invention is illustrated in the figures of the drawings which show.

DETAILED DESCRIPTION OF THE INVENTION

Figure 1:
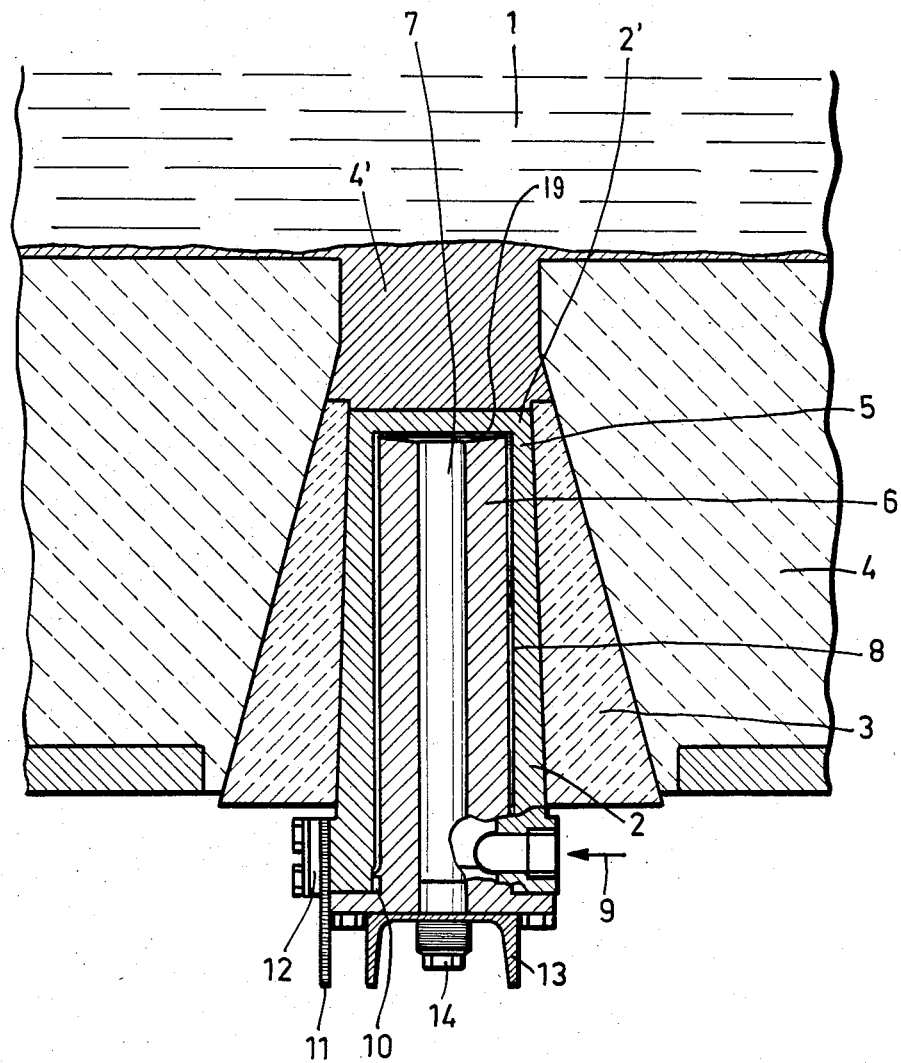
FIG. 1 is a longitudinal section through the illustrated electrode shown disposed in the fireproof lining of a furnace vessel.

Referring now to FIG. 1, the electrode 2 is shown to consist of a casing 5 and a replacement body 6.

The electrode 2 has a cooling medium inlet 9 and a central bore 7 which extends from the cooling medium inlet 9 to the electrode head 2'. A chamber 19 is located at the electrode 2' between the replacement body 6 and the casing 5 for distributing the cooling medium. An annular slit 8 is arranged between the annular sides of the casing 5 and the replacement body 6 and extends from the chamber 19 to the cooling medium outlet (not shown) in the region of the collecting ring 10.

The electrode 2 is connected to means for supplying or removing current 11 through the clamping means 12.

The electrode is secured by suitable fastening means 13 and 14 to the furnace.

The electrode 2 is sheathed by a conical fireproof, or refractory, component 3. The fireproof component 3 is embedded into the fireproof, or refractory, lining 4 of the furnace vessel. The electrode head 2' and the fireproof lining 4 define a cavity 4'. Electrically conductive wear-resistant material of solidified melt 1, in particular graphite, collects in the cavity 4' and protects the electrode head 2'.

Figure 2:
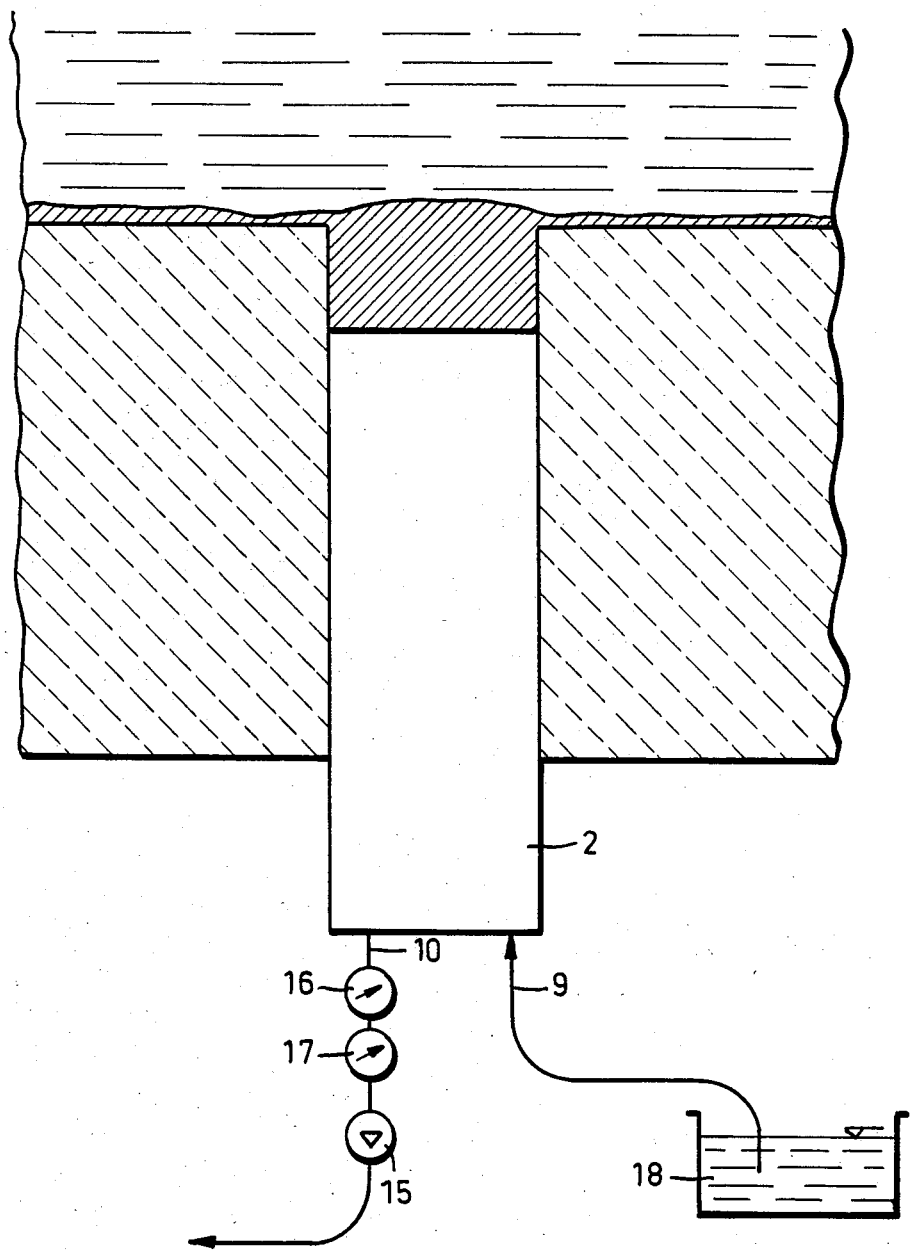
FIG. 2 is a schematic diagram of the cooling medium supply system for the electrode arrangement of the invention.

Referring now to FIG. 2, the operation of the cooling medium supply is schematically shown. A pump 15 sucks the fluid medium via the cooling channels of the electrode 2 from a pressureless storage container 18. A cooling medium inlet 9 and a collecting ring 10 are loacted at the rear end of the electrode 2.

Reference numerals 16 and 17 show in diagram form monitoring instruments connected between the collecting ring 10 and the pump 15 for monitoring temperature and pressure.

We claim:

1. An electrode assembly for a melting furnace having a refractory lining defining an inner surface comprising:
    an electrode having a head and a rear end including a casing and a replacement body disposed inside the casing, said body and said casing defining an annular slit between annular facing sides and defining a chamber at the head between the casing and the body, said chamber being in fluid communication with said annular slit;
    said body having a central bore which is in fluid communication with a cooling medium inlet at the rear end and the chamber, said central bore extending from the rear end to the chamber;
    an outlet disposed in the rear end and in fluid communication with the slit;
    a terminal means formed on the rear end for connecting the electrode to an electrical circuit; and
    a conical refractory component sheathing the exterior of the casing and being embedded in the refractory lining of the furnace, said conical refractory component being frusto-conical in shape with its broad end being disposed at the exterior of the furnace and its narrow end being adjacent the head, said head and said narrow end defining a base of a cavity formed in the refractory lining in which electrically conductive wear-resistant material of solidified melt collects to form a protective cap over the head of the electrode.

2. The electrode assembly of claim 1, and means for pumping a cooling medium from the inlet, through the central bore, through the chamber, through the annular slit and through the outlet.

3. The electrode assembly of claim 2, wherein said pumping means comprises a suction pump in fluid communication with the outlet and a nonpressurized fluid storage container in fluid communication with the inlet.

4. An electrode arrangement in a melting furnace including a refractory lining having an inner surface, an electrode received within a cavity formed in the refractory lining, the electrode having channels for receiving a cooling medium, said channels extending through the electrode to a head portion of the electrode, the improvement comprising:
    a conical refractory body of fireproof material surrounding the electrode and being received within the cavity in the refractory lining of the furnace, said conical refractory body being enlarged at its end opposite the electrode head and being inserted from the exterior of the furnace into the cavity, the head portion of the electrode and the portion of the cavity between the head portion and the inner surface of the lining defining a portion of the cavity which is filled with an electrically conducting, wear-resistant material.

5. The electrode arrangement of claim 4, said electrically conducting wear-resistant material being graphite.

* * * * *